US008577528B2

(12) United States Patent
Uyeki

(10) Patent No.: US 8,577,528 B2
(45) Date of Patent: Nov. 5, 2013

(54) SYSTEM AND METHOD FOR UPDATING CHARGE STATION INFORMATION

(75) Inventor: Robert M. Uyeki, Torrance, CA (US)

(73) Assignee: Honda Motor Co., Ltd. (JP)

( * ) Notice: Subject to any disclaimer, the term of this patent is extended or adjusted under 35 U.S.C. 154(b) by 276 days.

(21) Appl. No.: 12/973,626

(22) Filed: Dec. 20, 2010

(65) Prior Publication Data

US 2012/0123670 A1    May 17, 2012

Related U.S. Application Data

(60) Provisional application No. 61/414,396, filed on Nov. 16, 2010.

(51) Int. Cl.
| B60L 9/00 | (2006.01) |
| G01M 17/00 | (2006.01) |
| H01M 10/44 | (2006.01) |
| H02J 7/14 | (2006.01) |
| H02J 7/00 | (2006.01) |

(52) U.S. Cl.
USPC ........... 701/22; 701/31.4; 701/31.5; 320/101; 320/104; 320/109

(58) Field of Classification Search
USPC ............ 230/109; 320/109; 701/22, 31.4, 31.5
See application file for complete search history.

(56) References Cited

U.S. PATENT DOCUMENTS

| 4,309,644 A * | 1/1982 | Reimers et al. ............... 318/139 |
| 5,202,617 A * | 4/1993 | Nor ............................. 320/130 |
| 5,487,002 A | 1/1996 | Diller et al. |
| 5,523,666 A * | 6/1996 | Hoelzl et al. .................. 320/109 |
| 5,539,399 A * | 7/1996 | Takahira et al. .......... 340/995.27 |
| 5,545,046 A * | 8/1996 | Masuda et al. ................ 439/142 |
| 5,548,200 A * | 8/1996 | Nor et al. ...................... 320/109 |
| 5,790,976 A | 8/1998 | Boll et al. |
| 5,815,824 A | 9/1998 | Saga et al. |
| 6,055,477 A | 4/2000 | McBurney et al. |
| 6,185,501 B1 * | 2/2001 | Smith et al. ................... 701/540 |
| 6,430,494 B1 * | 8/2002 | Inoue et al. ..................... 701/96 |
| 6,577,952 B2 | 6/2003 | Geier et al. |
| 6,614,204 B2 * | 9/2003 | Pellegrino et al. ............ 320/109 |
| 6,625,539 B1 * | 9/2003 | Kittell et al. ................. 701/29.3 |
| 6,836,653 B1 * | 12/2004 | Kang ............................ 455/408 |
| 7,062,371 B2 | 6/2006 | Gault et al. |
| 7,402,978 B2 * | 7/2008 | Pryor ............................ 320/104 |
| 7,693,609 B2 * | 4/2010 | Kressner et al. .............. 700/291 |

(Continued)

OTHER PUBLICATIONS

Nissan USA, "Answers: charging," 2010, date unknown, four pages. [Online] [Retrieved on Oct. 13, 2010] Retrieved from the Internet <URL:http://www.nissanusa.com/leaf-electric-car/faq/list/charging#/leaf-electric-car/faq/list/charging.>.

(Continued)

Primary Examiner — Thomas Black
Assistant Examiner — Tyler Paige
(74) Attorney, Agent, or Firm — Fenwick & West LLP; Mark Duell

(57) ABSTRACT

A system for updating a charge station database including information about charge station location and/or characteristic by determining and verifying charge station location and characteristics after a vehicle connects to a charging station. The vehicle determines (probes) the charge station location based upon the location of the vehicle while connected to the charging station. This location information is transmitted by the vehicle to a central database.

15 Claims, 7 Drawing Sheets

(56) References Cited

U.S. PATENT DOCUMENTS

| | | | |
|---|---|---|---|
| 7,747,739 B2* | 6/2010 | Bridges et al. | 709/224 |
| 7,792,613 B2* | 9/2010 | Kressner et al. | 700/296 |
| 7,844,370 B2* | 11/2010 | Pollack et al. | 700/291 |
| 7,849,944 B2* | 12/2010 | DeVault | 180/65.29 |
| 8,164,300 B2* | 4/2012 | Agassi et al. | 320/104 |
| 8,266,075 B2* | 9/2012 | Ambrosio et al. | 705/412 |
| 8,290,649 B2* | 10/2012 | Iwashita et al. | 701/22 |
| 2004/0093155 A1* | 5/2004 | Simonds et al. | 701/200 |
| 2007/0150186 A1* | 6/2007 | Ingulsrud | 701/211 |
| 2007/0168524 A1* | 7/2007 | Chao et al. | 709/228 |
| 2008/0167812 A1* | 7/2008 | Geelen | 701/213 |
| 2009/0177580 A1* | 7/2009 | Lowenthal et al. | 705/39 |
| 2009/0313032 A1 | 12/2009 | Hafner et al. | |
| 2010/0082277 A1* | 4/2010 | Ballard | 702/63 |
| 2010/0082464 A1* | 4/2010 | Keefe | 705/32 |
| 2010/0161481 A1 | 6/2010 | Littrell | |

OTHER PUBLICATIONS

U.S. Department of Energy, "Alternative Fuels and Advanced Vehicles Data Center: Data Collection Methodologies," date unknown, three pages. [Online] [Retrieved on Oct. 13, 2010] Retrieved from the Internet <URL:http://www.afdc.energy.gov/afdc/data/methodology.html.>.

Wapedia, "Wiki: Electric Vehicle Network (1/3)," date unknown, eight pages. [Online] [Retrieved on Oct. 13, 2010] Retrieved from the Internet <URL:http://wapedia.mobi/en/Electric_vehicle_network.>.

PCT International Search Report and Written Opinion, PCT Application No. PCT/US2011/060762, Mar. 9, 2012, five pages.

* cited by examiner

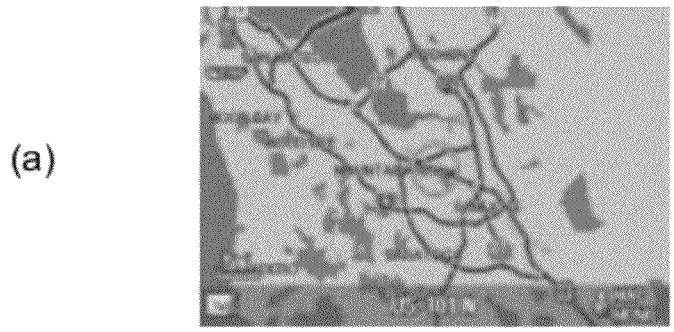
(a)
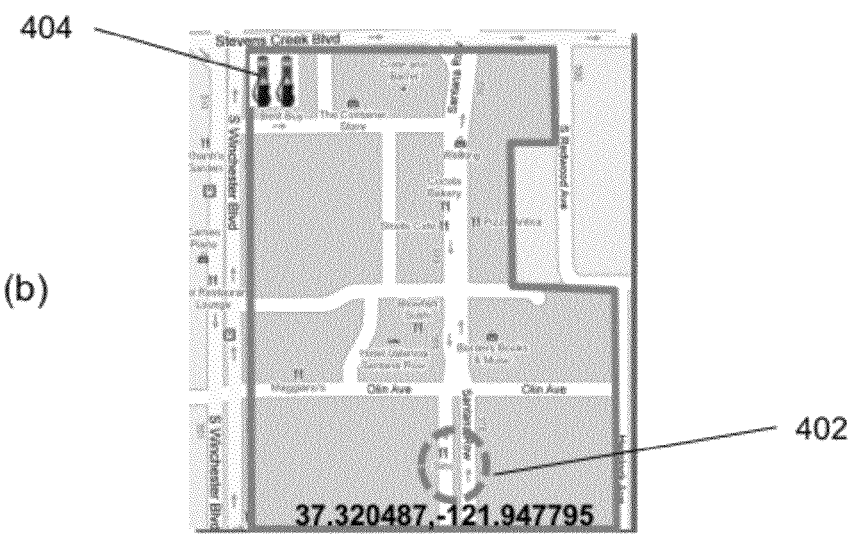
(b)
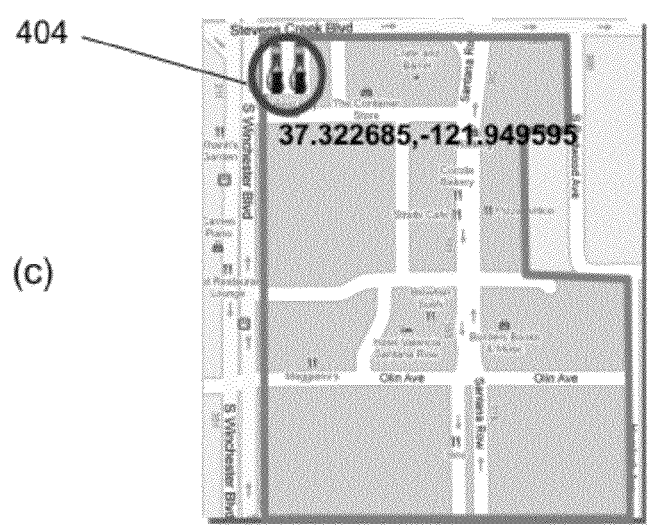
(c)
Figure 4

SYSTEM AND METHOD FOR UPDATING CHARGE STATION INFORMATION

RELATED APPLICATIONS

This application claims priority to U.S. Provisional application 61/414,396 filed on Nov. 16, 2010 by Okino et al. which is incorporated by reference herein in its entirety.

BACKGROUND

Electric vehicles are vehicles that use one or more electric motors for propulsion of the vehicle. The electric motors are powered by rechargeable batteries on-board the vehicle. Because electric vehicles are powered by on-board batteries, their driving range is limited by the amount of charge in their batteries. When a vehicle's batteries get low on charge, the vehicle can be recharged at a charging station. However, currently there is a limited number of charging stations for electric vehicles. The embodiments described herein show an improved methodology to identify charging location and to route a vehicle to a charging station.

BRIEF DESCRIPTION OF THE DRAWINGS

FIG. 4 is an illustration of embodiments in which the location of the charging station is different from the location identified by a vehicle's navigation system for the point of interest in which the charging station resides.

Figure 1:
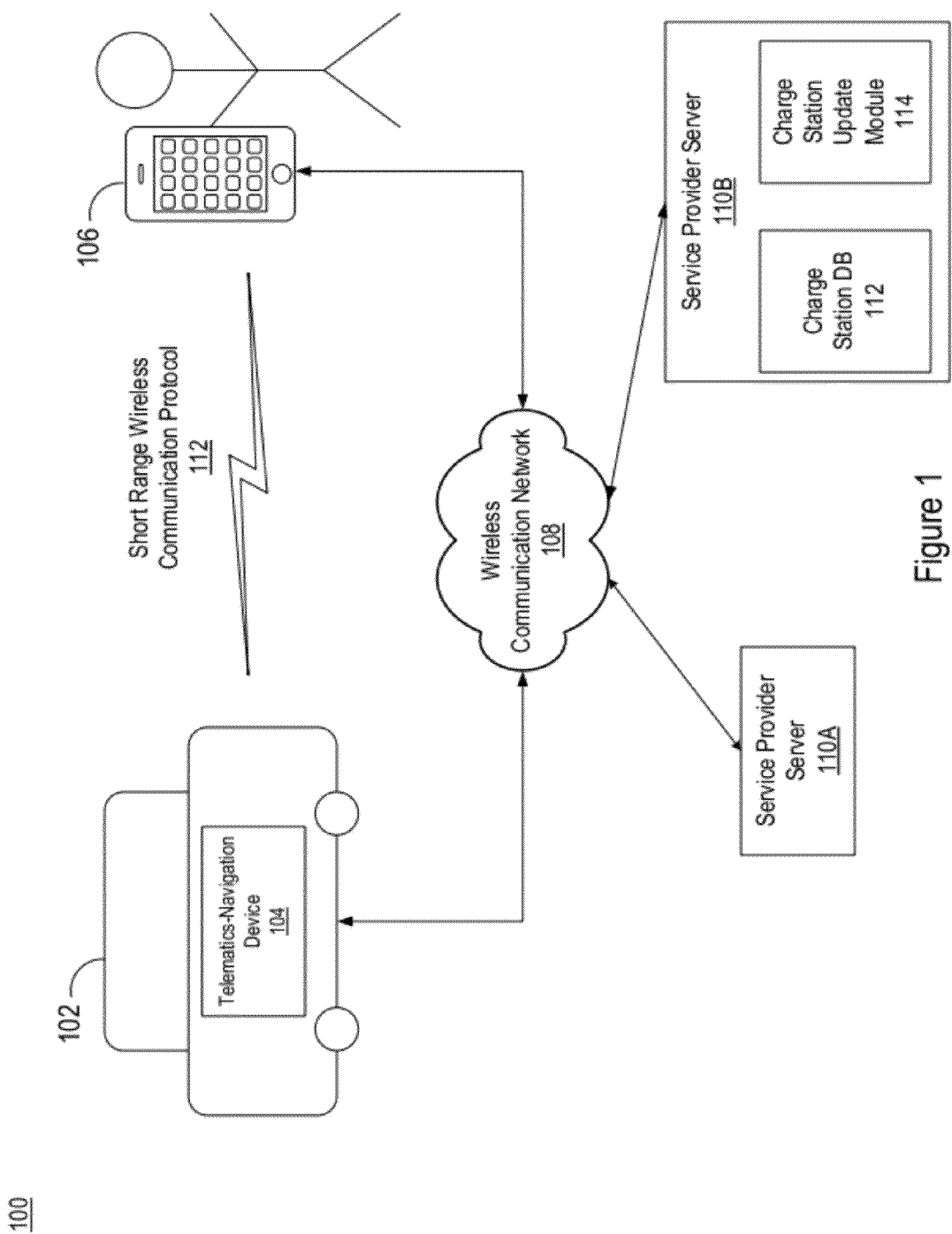
FIG. 1 is a high-level block diagram of a vehicle communication environment according to one embodiment.

The figures depict various embodiments of the present embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are now described with reference to the figures where like reference numbers indicate identical or functionally similar elements. In the figures, a letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," and/or "110B" in the figures). Also in the figures, the left most digits of each reference number correspond to the figure in which the reference number is first used.

FIG. 1 is a high-level block diagram of a vehicle communication environment 100 according to one embodiment. FIG. 1 illustrates an electric vehicle (EV) 102, a mobile device 106, and service provider servers 110 connected by a wireless communication network 108. The service provider servers 110 can include in its memory a charge station database 112 and a charge station update module 114.

The electric vehicle 102 represents a vehicle that contains one or more electric motors for propulsion of the vehicle 102. The electric motors are powered by rechargeable batteries on-board the vehicle 102. The on-board batteries are charged when the vehicle 102 is connected to an outside power source. For example, the batteries may be charged by connecting the vehicle 102 to a charging station that draws power from a power grid. The on-board batteries may also be charged using regenerative braking or by other techniques or systems that may be part of the vehicle 102. In one embodiment, the electric vehicle 102 is purely electric in that it only has an electric motor. In another embodiment, the electric vehicle 102 has both an electric motor and internal combustion engine. In some embodiments, the electric vehicle 102 may have any number of electric motors (e.g., an electric motor at each wheel, on select wheels, or in other configurations) and/or internal combustion engines and they may operate in series (e.g., as in an extended range electric vehicle), in parallel, or some combination of series and parallel operation.

The electric vehicle 102 includes a telematics-navigation device 104, in some embodiments the telematics unit does not include navigation functionality. The telematics-navigation device 104 represents a device that exchanges information with entities coupled to the wireless communication network 108 and with entities that are within range of a short range wireless communication protocol 112. The telematics-navigation device 104 can communicate with a mobile device 106 via the short range wireless communication protocol 112. The short range wireless communication protocol 112 is a protocol that uses short radio wavelengths to exchange data over short distances. Therefore, the communication range of the protocol 112 is limited. In one embodiment, the short range wireless communication protocol 112 is Bluetooth®. In some embodiments other types of point-to-point or network-enabled communication are used. For example, WiMax may be used as a point to point communication protocol with a range of miles.

The mobile device 106 represents a portable device that can be carried by the driver of the electric vehicle 102 when in the vehicle 102 and when the driver is away from the vehicle 102. The mobile device 106 is configured to communicate via the wireless communication network 108 and the short range wireless communication protocol 112. Examples of a mobile device (MD) 106 include a cellular phone, personal device assistant (PDA), smart phone, pocket personal computer (PC), laptop computer, smart watch or other devices having a processor, communications capability and are easily transportable, for example. In some embodiments the vehicle 102 can communicate with the wireless communication network via the mobile device 106.

Returning to FIG. 1, the service provider servers 110A and 110B represent entities that perform services for the electric vehicle 102 and/or the mobile device 106. In one embodiment, the service provider servers 110 provide information to electric vehicle 102 and the mobile device 106 to allow them to perform certain functions. For example, the service provider servers 110 may provide the vehicle 102 and the mobile device 106 with charge station information, traffic information, weather information, road condition information, map information, location information, and driving directions that the vehicle 102 and/or the mobile device 106 may display or use to perform other operations. Although only two service provider servers 110 are shown in FIG. 1, any number of service provider servers 110 can be connected to the wireless communication network 108.

The wireless communication network 108 represents a communication pathway between the electric vehicle 102, the mobile device 106, and the service provider servers 110. In one embodiment, the wireless communication network 108 is a cellular network comprised of multiple base stations, controllers, and a core network that typically includes multiple switching entities and gateways. In one embodiment, the wireless communication network 108 is a wireless local area network (WLAN) that provides wireless communication over a limited area. In one embodiment, the WLAN includes an access point that connects the WLAN to the Internet. The wireless communication network 108 can include satellites.

Figure 2:
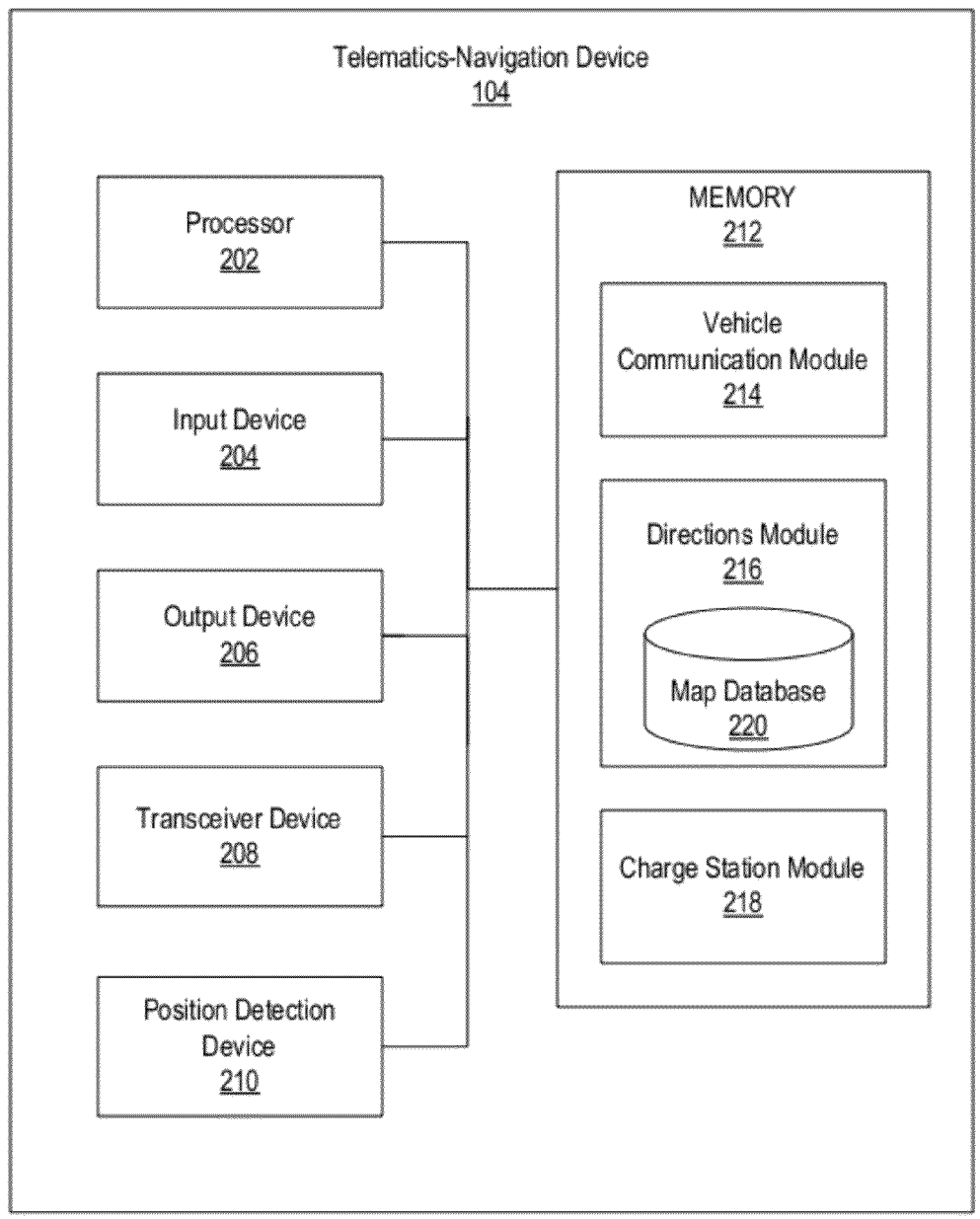
FIG. 2 is a high-level block diagram illustrating a detailed view of a telematics-navigation device according to one embodiment.

FIG. 2 is a high-level block diagram illustrating a detailed view of the telematics-navigation device 104 according to one embodiment. The telematics-navigation device 104 includes a processor 202, an input device 204, an output device 206, a transceiver device 208, a position detection device 210, and a memory 212.

The processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 202 comprises an arithmetic logic unit, a microprocessor, a general purpose computer, or some other information appliance equipped to transmit, receive and process electronic data signals from the memory 212, the input device 204, the output device 206, the transceiver device 208, or the position detection device 210.

The input device 204 is any device configured to provide user input to the telematics-navigation device 104 such as, a cursor controller or a keyboard. In one embodiment, the input device 204 can include an alphanumeric input device, such as a QWERTY keyboard, a key pad or representations of such created on a touch screen, adapted to communicate information and/or command selections to processor 202 or memory 212. In another embodiment, the input device 204 is a user input device equipped to communicate positional data as well as command selections to processor 202 such as a joystick, a mouse, a trackball, a stylus, a pen, a touch screen, cursor direction keys or other mechanisms to cause movement adjustment of an image.

The output device 206 represents any device equipped to display electronic images and data as described herein. Output device 206 may be, for example, an organic light emitting diode display (OLED), liquid crystal display (LCD), cathode ray tube (CRT) display, or any other similarly equipped display device, screen or monitor. In one embodiment, output device 206 is equipped with a touch screen in which a touch-sensitive, transparent panel covers the screen of output device 206. In one embodiment, the output device 206 is equipped with a speaker that outputs audio as described herein.

The transceiver device 208 represents a device that allows the telematics-navigation device 104 to communicate with entities via the wireless communication network 108 and the short range wireless communication protocol 112. The transceiver device 208 is used by the telematics-navigation device 104 to communicate with the mobile device 106 and the service provider servers 110. Although a single transceiver device 208 is shown, it should be understood that the telematics-navigation device 104 may include multiple transceiver devices. For example, one transceiver device may be configured to communicate via the wireless communication network 108 and another transceiver device may be configured to communicate via that short range protocol 112. In one embodiment, the transceiver device 208 is for one or more of the following communications: infrared communication, IEEE 802.11a/b/g/n/p communication, 3 G communication, 3GPP Long Term Evolution (LTE), IEEE 802.16 (or WiMax) communication, or radio frequency communication. It is envisioned that other protocols can also be used.

In one embodiment, the short range wireless communication protocol 112 is Bluetooth® and the transceiver device 208 is used for Bluetooth communication. The communication range of the transceiver device 208 via Bluetooth is limited. Typically the communication range via Bluetooth is up to 100 meters depending on the transceiver device 208 and obstacles. The transceiver device 208 only communicates via Bluetooth with devices with which it has established a connection. A connection with a device will last as long as the device is within range or until one of the devices terminates the connection.

Typically, the first time a connection is being established between two devices, the devices must be paired. The pairing process is started by a first device making its Bluetooth link visible to the second device. The second device identifies the first device and sends a connection request to the first device. If the request is accepted by the first device, a link key is created for their connection and stored by both devices. Once the link key has been stored by both devices, the pairing process is complete and data can be exchanged via Bluetooth. Two devices that have been paired can automatically establish a connection with each other when in range of each other. Here, the telematics-navigation device 104 is paired with the mobile device 106 of the electric vehicle's driver. If multiple drivers use the electric vehicle 102, the telematics-navigation device 104 may be paired with each of the driver's mobile device. It is envisioned that other pairing methods can be used.

The position detection device 210 represents a device that communicates with a plurality of positioning satellites (e.g., GPS satellites) to determine the geographical location of the electric vehicle 102. In one embodiment, to determine the location of the vehicle 102, the position detection device 210 searches for and collects GPS information or signals from four or more GPS satellites that are in view of the position detection device 210. Using the time interval between the broadcast time and reception time of each signal, the position detection device 210 calculates the distance between the vehicle 102 and each of the four or more GPS satellites. These distance measurements, along with the position and time information received in the signals, allow the position detection device 210 to calculate the geographical location of the vehicle 102. In alternative embodiments, systems and/or techniques other than position satellites may be used to determine a position of a vehicle. As examples, triangulation of cell phone towers or optical recognition of street signs may be used to determine a location. Additional techniques are set forth herein.

The memory 212 stores instructions and/or data that may be executed by processor 202. The instructions and/or data may comprise code for performing any and/or all of the techniques described herein. Memory 212 may be a dynamic random access memory (DRAM) device, a static random access memory (SRAM) device, Flash RAM (non-volatile storage), combinations of the above, or some other memory device known in the art. The memory 212 comprises a vehicle communication module 214, a directions module 216, and a charge station module 218. The modules are adapted to communicate with the processor 202, the input device 204, the output device 206, the transceiver device 208, and/or the position detection device 210.

The directions module 216 provides a user of the electric vehicle 102 with driving directions to a destination. When a request is received from a user for directions to a destination, the directions module 216 obtains from the position detection module 210 the current geographic location of the vehicle 102. Based on the current location and the destination, the directions module 216 retrieves a vector map from a map database 220. The map database 220 includes multiple vector maps. In one embodiment, the vector maps indentify the locations of charging stations and other establishments/points of interest (POI), e.g., restaurants, stores, schools, hospitals, and banks.

The directions module 216 locates the current location and the destination in the map. The directions module 216 identifies multiple routes from the current location to the destination. In one embodiment, the directions module 216 selects one of the routes based on user criteria, such as the fastest route, the shortest route, the least congested route, the most energy efficient route, street route, and highway route. In one embodiment, the directions module 216 uses information (e.g., traffic and weather information) from one or more service provider servers 110 to select a route. In another embodiment, the directions module 216 presents the identified routes to the user and allows the user to select a route. The directions module 216 provides directions through the output device 206 on how to get to the destination via the selected route.

The charge station module 218 includes information related to charge stations including location information including address and/or geographic coordinates, availability (operational, reservations), compatibility information, e.g., connector types, charge type (standard, fast, etc.). In alternate embodiments this information can be part of the map database 220. The discussion herein can therefore also apply to updating the map database 220.

Figure 3:
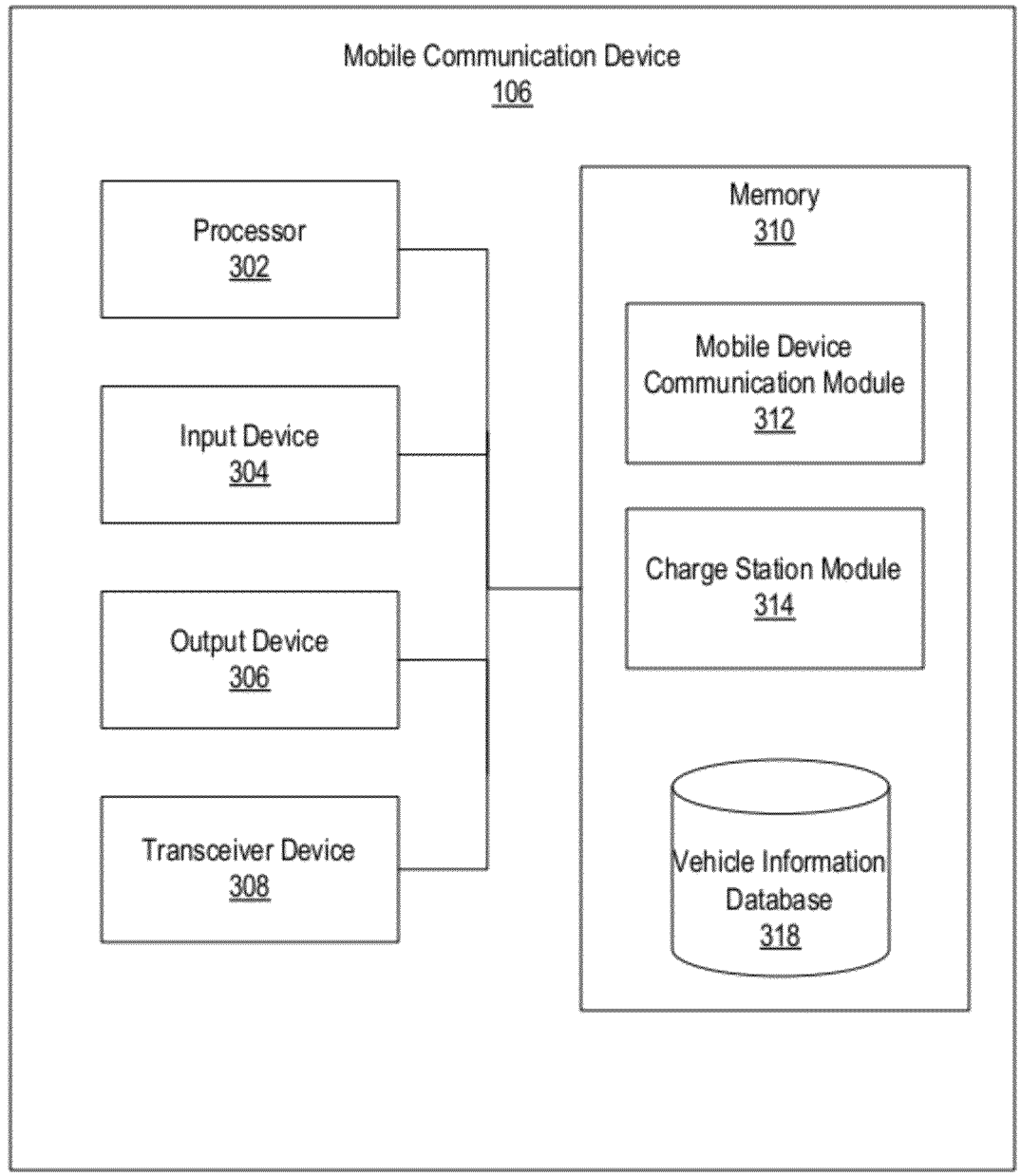
FIG. 3 is a high-level block diagram illustrating a detailed view of a mobile device according to one embodiment.

FIG. 3 is a high-level block diagram illustrating a detailed view of the mobile device 106 according to one embodiment. The mobile device 106 includes a processor 302, an input device 304, an output device 306, a transceiver device 308, and a memory 310.

The processor 302, input device 304, output device 306 and transceiver device 308 of the mobile device 106 have similar functionality to the processor 202, input device 204, output device 304 and transceiver device 304 of the telematics-navigation device 104. Therefore, for purposes of brevity a functional description of these devices is omitted.

Additionally, the memory 310 of the mobile device 106 has similar functionality to the memory 210 of the telematics-navigation device 104. However, the memory 310 of the mobile device 106 includes different modules than those of the telematics-navigation device 104. The memory 310 of the mobile device 106 includes a mobile device communication module 312, a charge station module 314 and a vehicle information database 318. The modules are adapted to communicate with the processor 302, input device 304, output device 306 and transceiver device 308.

When driving an electric vehicle 102 a common concern when leaving the house is will the driver make it to his/her destination. In situations where the driver is concerned about whether the vehicle's current state of charge (SOC) will enable it to reach the destination, the electric vehicle 102 can identify nearby charging stations and can generate a route to a charging station.

Conventional systems update vehicle map databases 220 periodically by, for example, annually releasing a new database, e.g., on DVDs. The database manufacturer may need to visit the POIs usch as charging stations to confirm the accuracy of the location and related information which introduces additional delay and costs in generating an updated database. Even with such precautions, these updates are outdated immediately. Inaccurate/outdated charging station locations may present problems if drivers rely on such locations and accordingly drive to an incorrect location because of an error in the address or because the geographic coordinates of the point of interest (POI) is different from the geographic coordinates of the charge station, e.g., in the example illustrated in FIG. 4.

If the state of charge (SOC) of the vehicle is substantially depleted, having inaccurate coordinates can result in the vehicle exhausting the charge and requiring towing in order to reach the charging station. In addition outdated databases may include inaccurate charging station information, e.g., the types of charging connector types, which may also result in a vehicle exhausting its power supply before reaching a proper charging station.

FIG. 4 is an illustration of embodiments in which the location of the charging station is different from the location identified by a vehicle's navigation system for the point of interest in which the charging station resides. As described above, the directions module 216 locates the current location and the destination in the map 220. The directions module 216 identifies multiple routes from the current location to the destination.

The locations of charging stations can be stored in the vehicle itself, e.g., in the charge station module 218 or map database 220, and/or the vehicle can access the locations via its telematics unit by connecting to a remote server 110. The vehicle can identify those charging stations that are within the range of the vehicle. For example if the electric vehicle has a remaining range of 60 miles but the vehicle is 90 miles from the ultimate destination, the vehicle can identify those charging stations within the 60 mile range and can also identify those charging stations that require the shortest detour from the planned path. In an embodiment, the directions module 216 identifies a route that enables the vehicle to reach the charging station with the least disruption from the planned path and can also identify how long the electric vehicle 102 needs to recharge in order to complete the trip to the destination. As described herein, this recharging time can be based upon, for example, the maximum charge available, efficiency of the charging station and the status of the vehicle's battery.

In another embodiment, the vehicle's navigation system/directions module 216 can route the driver along the path to the ultimate destination and suggest various charging locations along the way. The vehicle can also check the availability of various charging stations and provide the driver (or route the vehicle) to those charging stations with available charging ports.

There may be a situation where a vehicle's navigation system/directions module 216 is directing the driver to a charging station but the charging station is in a location where there is no GPS signal or cell phone signal or is in a location remote from the address of the point of interest's address. Therefore, while the driver may successfully arrive at the garage or point of interest, there may be a problem directing the driver to the actual charging station. FIG. 4(a) illustrates a display in the vehicle that shows the location of a charging station, e.g., at the Santana Row Mall in San Jose, Calif. FIG. 4(a) is a small scale map showing this location. The Santana Row Mall may have an address stored in the map database 220 of "368 Santana Row, San Jose, Calif." This location 402 has geographic coordinates of (37.320487, −121.947795) as illustrated in FIG. 4(b) with a scale much larger than the scale of FIG. 4(a). However, as shown in FIG. 4(b) the location 404 of the charging stations is remote from the location 402 of the POI. A driver attempting to locate the charging station needs more precision about the location of the charging station than is provided merely by the having the address of the POI. As shown in FIG. 4(c) the charging stations have geographic coordinates of (37.322685, −121.949595). In addition, charging stations are only compatible with certain vehicles, due to, for example, outlet connection types, a benefit of the embodiments is that this information is identified either directly via the "characteristics" of the charging station or indirectly, since the type of connection in the vehicle is known the charge station database will include the type of connections and/or compatibility with vehicles and the embodiments can have the option of only displaying charge stations that are compatible to the vehicle.

Figure 5:
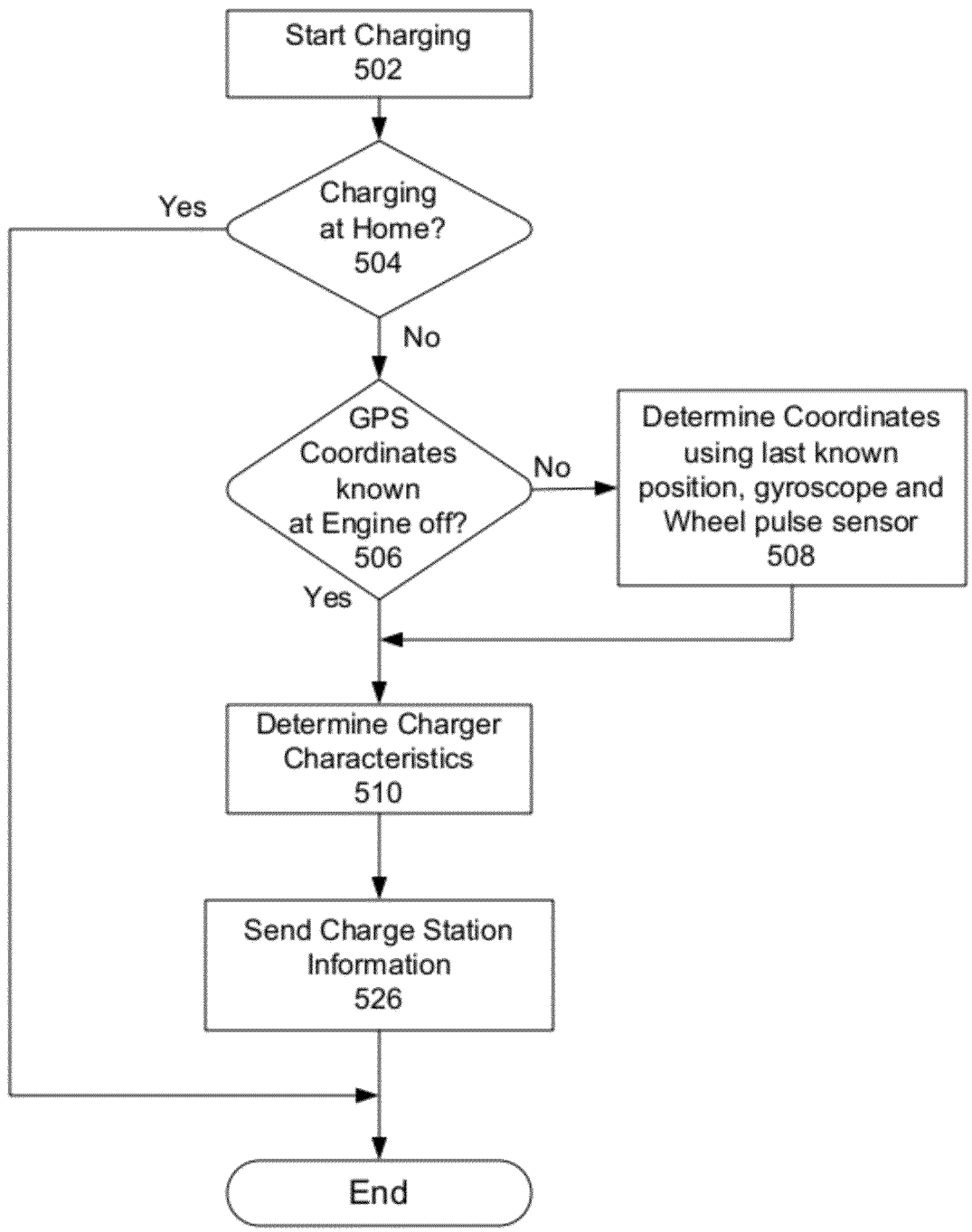
FIG. 5 is a flowchart of a method for determining characteristics of a charging station by a vehicle in accordance with one embodiment.

FIG. 5 is a flowchart of a method for determining characteristics including the location of a charging station by a vehicle in accordance with one embodiment. A purpose of this procedure is to identify new charging stations or to update the identified characteristics of existing charging stations in a charging station database stored, for example, in the charging station module 218 and/or a remote server 110. When a vehicle reaches a charging station and starts 502 charging, the vehicle determines 504 whether the vehicle is charging at home. This can be based upon last known GPS coordinates, type of charger etc. If the charging station is the user's home station, i.e., a private charging station, then the process can end since, in an embodiment, private/home charging stations need not be included in the charging station database in the charging station module 218 and/or remote server 110. If 504 the charging station is not at the driver's home (or otherwise identified as a private charging station) then the charge station module 218 (or other software) determines 506 whether the GPS (geographic) coordinates of the vehicle were known when the engine was turned off. If 506 the geographic coordinates were known, then the vehicle determines 510 charging station characteristics such as the connector type, charge voltage (standard/fast/other), location, and/or availability. The charging station information, including the location can be sent 526 and stored as part of a charge station database in the charge station module 218 and/or transmitted 526 to a central server 110 that includes a charge station database 112. This transmission 526 (or 726) can occur while charging or at a later time, e.g., after the vehicle's engine is started. Additional details about the central server 110 is set forth herein.

In an alternate embodiment, the location of the charging station can be determined by identifying the change in location, e.g., distance, direction and elevation, occurring after the vehicle connection to the charging station is removed, for example, after the vehicle is re-started and moves. The change of distance determination can be done in a manner similar to that described herein with respect to steps 508 or 708, using the gyroscope and wheel pulse sensor, for example. When the GPS signals are again available to the vehicle, the charge station location can be determined by modifying the location identified by the GPS signals with the determined change in location information. In embodiments, the charge station location is estimated using the location of the vehicle, this estimate is satisfactory since the vehicle is connected to the charge station. In this embodiment, the vehicles are probes to accurately identify and verify charge station locations and characteristics.

If 506 the GPS coordinates of the vehicle were not known when the engine was turned off, then the position detection device 210 uses the last known GPS position and then estimates 508 the current position of the vehicle based upon gyroscope readings which can provide directional information and elevation information along with wheel pulse information which can provide distance information and turning information. It is envisioned that additional vehicle sensor information can be used to assist in estimating the current position of the vehicle. In another embodiment, triangulation of cell phone towers or optical recognition of street signs may also be used to assist in determining the current location. In some embodiment the charge stations are networked, so connections may be made directly between the vehicle and the networked charge station, e.g., using a Bluetooth connection. As described above, the GPS coordinates of the vehicle may not be available if a vehicle is in a covered parking garage/area or the GPS system is inoperative.

Figure 6:
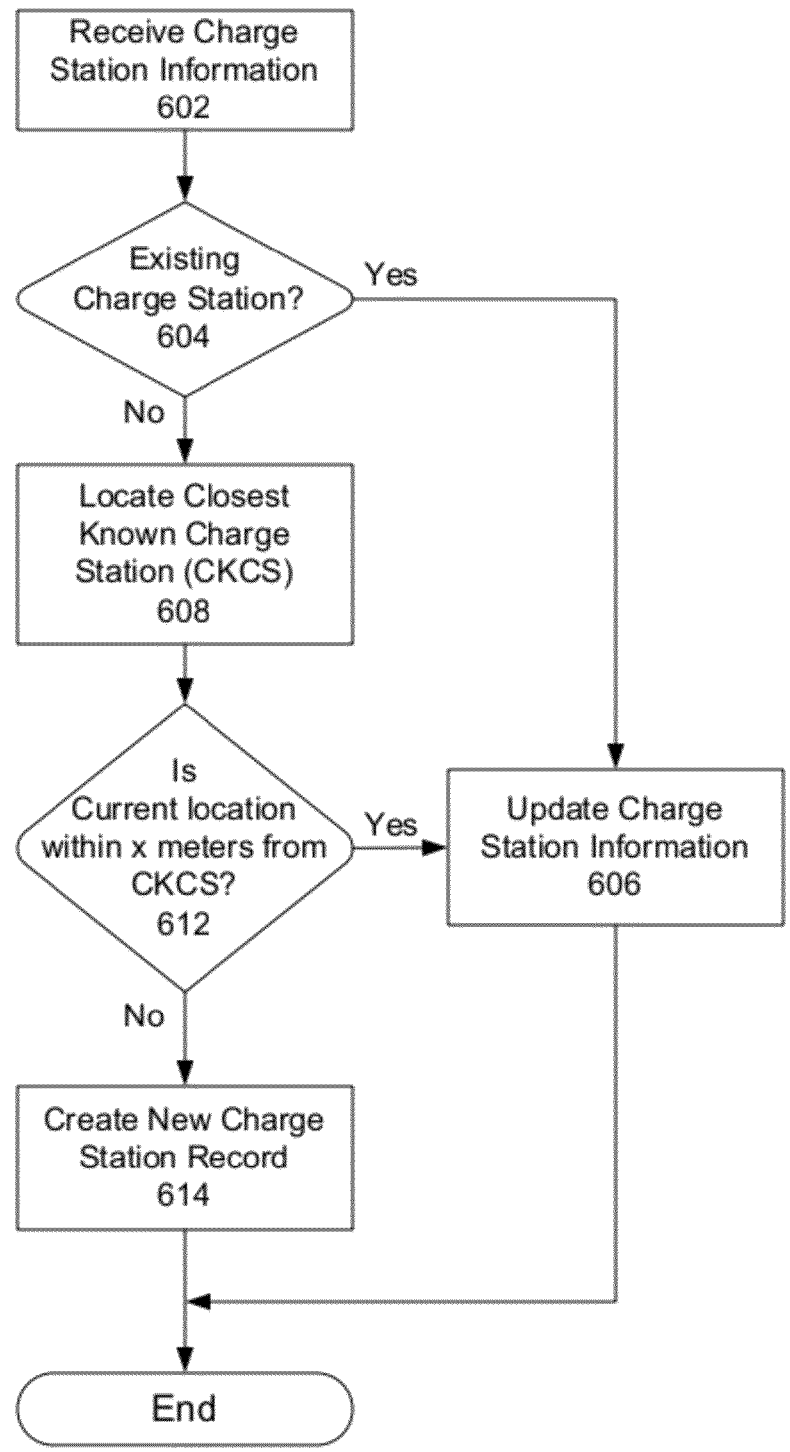
FIG. 6 is a flowchart of a method for updating a charging station database in a remote server and/or in the vehicle in accordance with one embodiment.

FIG. 6 is a flowchart of a method for updating a charging station database in a remote server 110 and/or in the vehicle in accordance with one embodiment. In an embodiment the charge station information transmitted in step 526 (or step 726) is received by the charge station module 218 and/or the remote server 110 and the charging station databases in the charge station module 218 and/or the remote server 110 is updated. For ease of discussion, the following description will be described with reference to the updating of the charge station database 112 in the remote server 110. The remote server 110 receives 602 the charge station information. The charge station update module 114 determines 604 whether the charge station information corresponds to a charge station already existing in the charge station database 112. This determination can check one or multiple parameters of the charge station such as the location of the charge station, the connector type, charge voltage, availability, compatibility, etc. If 604 the charge station information corresponds to an existing charge station then the charge station update module 114 updates 606 the charge station database 112 with the information, possibly including a timestamp and vehicle identifier from which the updated information was received.

If 604 the charge station information does not correspond to an existing charge station then the charge station update module 114 locates/identifies 608 the closest known charge station and determines the distance between the closest known charging station and the newly identified charge station. In one embodiment, the charge station update module compares the current charging station with those having similar characteristics in the database, e.g., having similar connector types, charge voltage, etc. In other embodiments, the comparison is with all charging stations. If 612 the distance is less than a threshold, e.g., 5-50 meters, then the charge station update module 114 presumes that the charge station is the same as the closest known charge station and updates 606 the charge station information database 112 based upon the information received in step 602.

If 612 the distance is more than a threshold then the charge station update module 114 presumes that it has received information for a new charge station and creates 614 a new charging station record in the charge station database 112 based upon the information received in step 602.

In an embodiment, the charge station database 112 includes a verification protocol in which the database 112 is updated after receiving similar information from multiple vehicles or from a single vehicle multiple times. The number of times/vehicles similar information must be received in order to satisfy the verification protocol can vary. In an embodiment, the first time new information is received, before updating 606 charge station information or creating 614 a new charge station record, the information can be stored in a related database, or a related record of the charge station database 114 along with a counter indicating the number of times similar information has been received. Once the counter reaches the threshold in the verification protocol the charge station information can be updated 606 or a new charge station record can be created 614.

Figure 7:
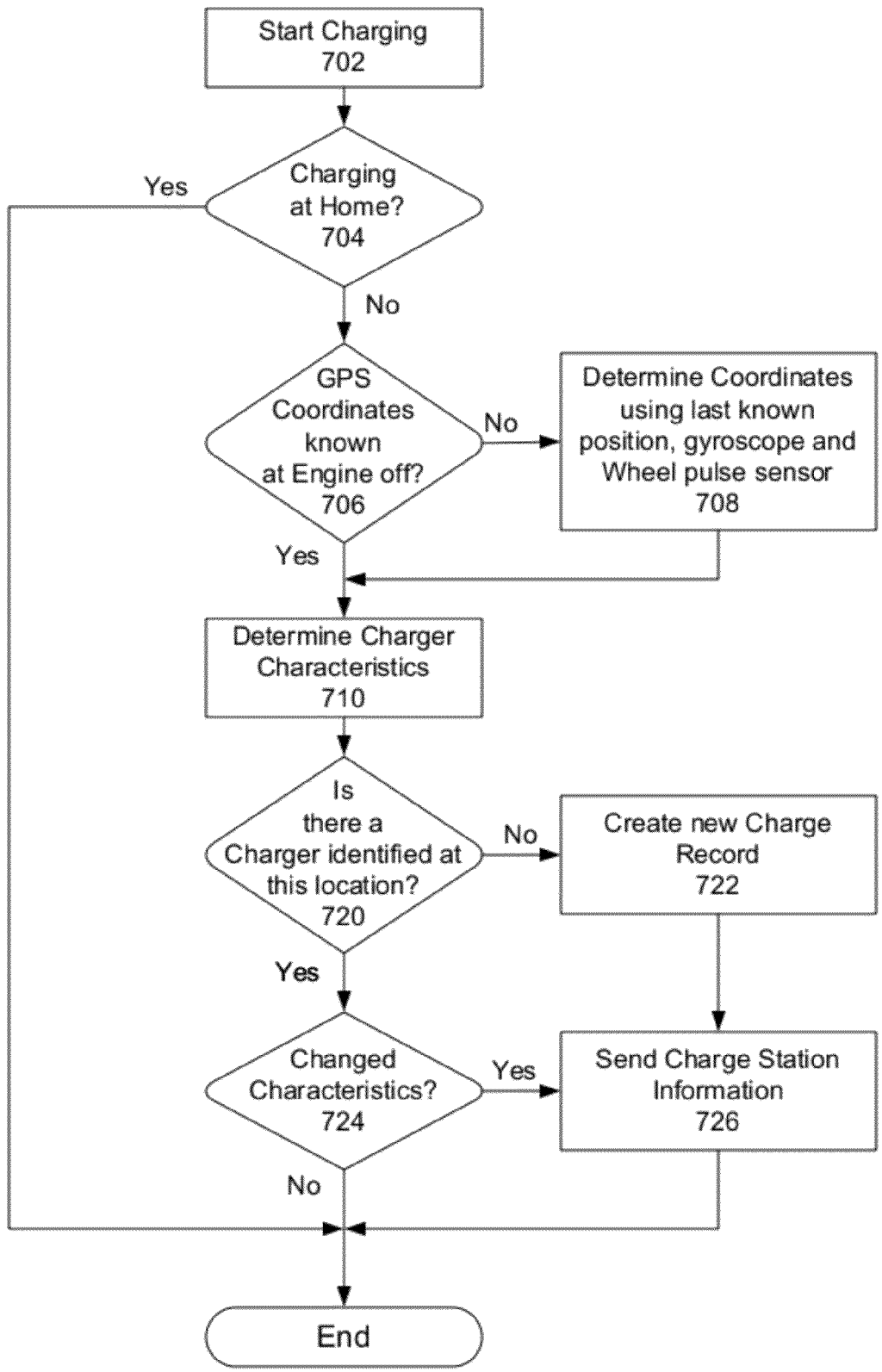
FIG. 7 is a flowchart of a method for determining characteristics of a charging station by a vehicle in accordance with one embodiment.

FIG. 7 is a flowchart of a method for determining characteristics of a charging station by a vehicle in accordance with one embodiment. FIG. 7 is an alternate embodiment to the method set forth in FIG. 5. When a vehicle reaches a charging station and starts 702 charging, the vehicle determines 704 whether the vehicle is charging at home. As described above, this can be based upon last known GPS coordinates, the type of charger, etc. If 704 the charging station is the user's home station, i.e., a private charging station, then the process can end as in an embodiment, private/home charging stations need not be included in the charging station database in the charging station module 218 and/or remote server 110. If 704 the charging station is not at the driver's home (or, for example, otherwise identified as a private charging station) then the charge station module 218 (or other software) determines 706 whether the GPS (geographic) coordinates of the vehicle were known when the engine was turned off.

If 706 the GPS coordinates of the vehicle were not known when the engine was turned off, then the position detection device 210 uses the last known GPS position and estimates 708 the current position of the vehicle based upon gyroscope readings which can provide directional information and elevation information along with wheel pulse information which can provide distance information and turning information. As described above, it is envisioned that additional vehicle sensor information can be used to assist in estimating the current position of the vehicle. In another embodiment, triangulation of cell phone towers or optical recognition of street signs may also be used to assist in determining the current location. The process then continues with step 710.

If 706 the geographic coordinates were known when the engine was turned off, then the vehicle determines 710 the charging station characteristics such as the connector type, charge voltage (standard/fast/other), location, and/or availability. The information, including the location can be stored as part of a charge station database in the charge station module 218 and/or transmitted to a central server 110 that includes a charge station database. Additional details about the central server 110 is set forth herein. In order to reduce communication traffic between the vehicle and the remote server 110, in this embodiment an update is sent when there is a change to the database. The charge station module 218 then determines 720 whether the charger characteristics correspond to an existing charge station. This determination 720 can be based on the geographic coordinates. If the charge station module 218 determines 720 that no charging station is at or near the geographic location determined based on the GPS coordinates at engine off or by the process outlined above in step 708, then the charge station module 218 can, optionally, create 722 a new charge station record and send 726 the charge station record and related information to the charge station update module 114 and/or can update the vehicle's charge station database.

If the charge station module 218 determines 720 that the geographic location corresponds to an existing charging station then the charge station module 218 can, determine whether 724 any of the charger characteristics have changed by comparing the determined charge station characteristics to the characteristics stored in the charging station database in the vehicle's memory 212. If 724 any of the charger characteristics have changed then the charge station module 218 can send 726 the charge station information to the charge station update module 114 and/or can update the vehicle's charge station database.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

The embodiments also relates to an apparatus for performing the operations herein. This apparatus may be specially constructed for the required purposes, or it may comprise a general-purpose computer selectively activated or reconfigured by a computer program stored in the computer. Such a computer program may be stored in a transitory or non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

What is claimed is:

1. A system for identifying charge station characteristics comprising:
    a vehicle including:
    a connector for coupling the vehicle to a charge station, the connector configured to receive a first signal from the charge station;
    a battery for receiving the first signal through the connector to increase energy stored by the battery;
    a charge station information device to determine:
        a location based upon a location of the vehicle when the connector is coupled to the charge station;
        a charging outlet connection type indicating compatibility of the charge station with the vehicle connector;
        an availability of the charge station; and
    a transmission device for transmitting charge station information.

2. The system of claim 1, wherein the location determination system comprises:
    a location signal receiver capable of receiving location signals; and
    a position estimation device using a distance measuring device and an elevation determination device to determine a change in location based upon movement after the location signals are no longer received, and determining a charge station location by determining the location of the vehicle when the connector is coupled to the charge station based upon the location signals and the change in location determination.

3. The system of claim 2, wherein the distance measuring device includes a wheel pulse unit for determining a distance travelled based upon wheel rotation and the elevation determination device includes a gyroscope.

4. The system of claim 1, further comprising:
    a remote server including:
        a remote charge station database; and
        an update module for updating the remote charge station database with information about a new charge station when the received charge station location does not substantially match an existing charge station in the charge station database.

5. The system of claim 1, wherein the location signals are GPS signals.

6. The system of claim 1, wherein the charge station information includes the charge voltage.

7. The system of claim 1, wherein the transmission device is configured to transmit the charge station information based on a request from the vehicle.

8. A method for identifying charge station characteristics comprising the steps of:
    coupling a vehicle to a charge station via a connector, the connector configured to receive a first signal from the charge station;
    determining characteristics of the charge station when the connector is coupled to the charge station, the characteristics including:
        a location of the charge station based upon a vehicle location when the connector is coupled to the charge station, a charging outlet connection type indicating compatibility of the charge station with the vehicle connector, and an availability of the charge station; and
    transmitting, by the vehicle, the charge station characteristic.

9. The method of claim 8, wherein the step of determining the charge station location further comprises the steps of:
    receiving location signals; and
    determining a change in location of the vehicle based upon movement occurring after the location signals are no longer received, and determining a charge station location by determining the location of the vehicle when the connector is coupled to the charge station based upon the location signals and the change in location determination.

10. The method of claim 9, wherein the step of determining a change in location includes the steps of:
    measuring the distance traveled using wheel rotation measurements and measuring changes in direction and elevation using gyroscope measurements.

11. The method of claim 8, further comprising the steps of:
    receiving the charge station information at a remote server, and
    updating the charge station database with information about a new charge station when the received charge station location does not substantially match an existing charge station in the charge station database.

12. The method of claim 8, wherein the location signals are GPS signals.

13. The method of claim 8, wherein the charge station characteristics include the charge voltage.

14. The method of claim 8, wherein the transmission device is configured to transmit the charge station characteristic based on a request from the vehicle.

15. A method for updating a database of charge station characteristics comprising:
    receiving a transmission from a vehicle coupled to a charge station, the transmission including a characteristic of the charge station comprising a location of the charge station based upon a location of the vehicle when the connector is coupled to the charge station, a charging outlet connection type indicating compatibility of the charge station with the vehicle connector and an availability of the charge station;
    determining whether a pre-existing record in the database exists for the charging station;

updating the location, the charging outlet connection type and the availability using the received transmission upon determining that the charging station is recorded in the database; and adding a record that includes the charging station location, the charging outlet connection type and the availability using the received transmission upon determining that the charging station is not recorded in the database.

\* \* \* \* \*